Sept. 15, 1953

D. E. MARNON ET AL 2,651,936

WETTING TEST DEVICE

Filed Sept. 8, 1950

Donald E. Marnon
Frank C. Snowden
INVENTOR

BY Edward J. Willey
Henry W. Cough
ATTORNEY

Patented Sept. 15, 1953

2,651,936

UNITED STATES PATENT OFFICE 2,651,936

WETTING TEST DEVICE

Donald E. Marnon, Phillipsburg, N. J., and Franklin C. Snowden, Easton, Pa., assignors to General Aniline & Film Corporation, New York, N. Y., a corporation of Delaware Application September 8, 1950, Serial No. 183,740

1 Claim. (Cl. 73—53)

The present invention relates to a wetting test device and more particularly to a device for automatically timing the wetting of a cotton skein or the like.

In the evaluation of the wetting properties of various compositions, particularly in the textile industry, the Draves wetting test is widely used. The apparatus comprises an elongated vertical glass tube containing the solution to be tested and a small weight attached by a flexible wire to a hook of standard weight which is adapted to be hooked to a skein of standard weight cotton yarn. In its operation the test comprises dropping the skein with the hook and weight attached thereto into the cylinder of test solution and observing the time which is required for the hook and skein to drop to the bottom of the cylinder. This is a measure of the wetting power of the test solution and the solution concentration is usually adjusted so that this time varies from a few seconds to a few minutes. A complete detailed description of the Draves wetting test is given in the American Association of Textile Chemists and Colorists, Technical Handbook 1949, pp. 143-145.

In order to obtain the highest possible accuracy it is necessary that the timing be accurate and previously there have been differences between the results depending upon the individual operator.

It is the object of the present invention to provide an apparatus for automatically recording the wetting time by the Draves method.

It is the further object of the present invention to provide an apparatus for automatically starting a timing device at the beginning of the Draves wetting test and shutting off the timing device as the test is completed.

These and other objects are attained by the present invention which comprises an elongated vertical container, a light source outside of the container and adapted to pass a light beam therethrough near the bottom thereof, a weight and a vane adapted to be dropped within said cylinder, means for attaching a skein to the vane, the weight being suspended below and spaced from the vane, a photoelectric pick-up unit, an electronic triggering circuit and an electric timing device adapted to record the difference in time between the passing of the weight past the light beam and the passing of the vane past the light beam.

In the accompanying drawing, the two figures are diagrammatic illustrations of the apparatus employed in accordance with the present invention for automatically timing the wetting of a cotton skein or the like.

Figure 1:
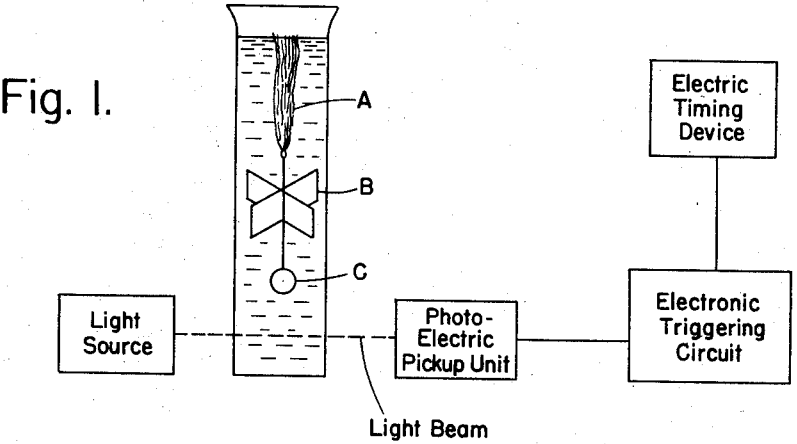
Figure 1 represents a self-explanatory diagrammatic illustration of the apparatus employed in the electronic modification of the Draves wetting test.

By reference to Fig. 1, there is shown the elongated vertical container, usually a glass cylinder of 500 ml. capacity containing a skein A usually of unwashed cotton, a vane B and a weight C. The skein may be hooked or otherwise attached to the vane and the weight is suspended below the vane by means of a flexible strand of wire or the like.

The vane may be of any desired shape and constructed of any material so long as it will interrupt the light beam and not float of its own accord nor be heavy enough to overcome the buoyancy of the skein. The weight may be of any size or shape so long as it will interrupt the light beam and be sufficiently heavy to overcome the buoyancy of the skein.

A light source which may be an ordinary electric lamp is placed at one side of the container and arranged so that a light beam will pass through the container just above the bottom thereof.

The photoelectric pickup unit is arranged at the opposite side of the container in line with the beam. An electronic triggering circuit is connected with the photoelectric pickup unit and this in turn is connected with an electric timing device.

In the operation of the device the container or cylinder is filled with the solution to be tested. The weight, vane and skein are dropped in and as the weight plunges to the bottom it interrupts the light beam causing the trigger circuit to start the timing device. After a sufficient time has elapsed for the wetting agent to wet the skein, the skein and vane drop down and as the vane interrupts the light beam the electronic triggering circuit shuts off the electric timing device such that the wetting time is automatically recorded.

Figure 2:
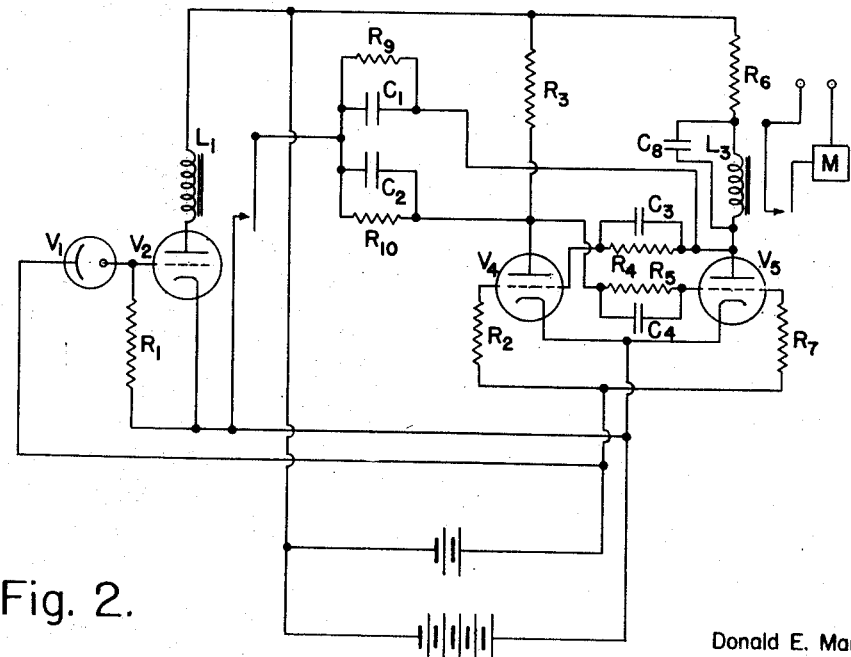
Figure 2 represents the electronic circuit of the triggering device employed as a part of the apparatus shown in Figure 1.

At Fig. 2, there is illustrated one type of direct current operated triggering circuit wherein $V_1$ is the photoelectric cell, $V_2$, $V_4$ and $V_5$ are amplifier tubes, $L_1$ and $L_3$ are relay coils, $C_1$ and $C_2$ are coupling condensers, $C_3$, $C_4$ and $C_8$ are condensers, the R's are resistors and M represents an electric timer.

When the weight or the vane passes through the light beam located at the bottom of the long cylindrical tube, the light is instantaneously blocked off from the photo tube ($V_1$). This action causes a sudden sharp decrease in the current flow through the resistor $R_1$ placing thereby a positive voltage pulse upon the grid element of the amplifier tube ($V_2$). This action causes tube $V_2$ to conduct current during the time light is blocked from the photo tube by the weight or vane. This conduction of current through the tube $V_2$, in turn, closes the relay contacts of the relay whose coil ($L_1$) is located in the plate circuit of said amplifier tube ($V_2$.) The closing of these contacts simultaneously connects the plates of the tubes ($V_4$, $V_5$), located in the timer switching circuit, to ground through the two RC circuits represented by $R_9C_1$ and $R_{10}C_2$ of the diagram of Figure 2. This action initiates the switching of the timer switching circuit which is a so-called trigger circuit having two stable states. This circuit switches back and forth between these two stable states alternately, each time the plates of $V_4$ and $V_5$ are connected to ground as described above. Since $V_4$ and $V_5$ are caused to conduct current alternately by the action of this circuit, the timer M, placed through a relay in the plate circuit of one of these tubes ($V_5$), starts when the light beam is first interrupted and stops when the light beam is next interrupted. An electric impulse relay can be used instead of the above-discussed trigger circuit. Thus, with the timer initially in the off position and set at zero time, it starts when the dropping weight interrupts the light beam and stops upon the subsequent interruption of the light beam by the vane attached to the sinking skein. The time of wetting of the skein is thus automatically obtained.

Preferrably the device may be enclosed in a box or other receptacle to constitute a single operating unit. The timing device may be simply an electric clock or may be a recording timing device which may record the elapsed time on a chart. By the use of a plurality of photoelectric units the device may be used for measuring the sinking time as well as the wetting time or alternatively this may be attained with the single photoelectric unit by first obtaining the wetting time using a short wire or thread between the weight and the vane, and repeating the test with a longer thread.

The wire or thread between the weight and the vane should be adjusted to such a length that any initial bobbing motion caused by dropping the weight and vane into the cylinder does not interrupt the light beam.

By the use of the present device more accurate data is obtainable, data is obtainable which checks from laboratary to laboratory and from time to time.

What we claim is:

An apparatus for measuring the wetting time of a textile material comprising a light-penetrable elongated vertical liquid container for receiving said textile material, a light source outside the container and adapted to pass a light beam therethrough near the bottom thereof, a first means and a second means for interrupting said light beam which means are connected together in spaced relationship and connected to the textile material, the said first means being of sufficient weight when submerged in the liquid of the container to overcome the buoyancy of the textile material and the said second means, the connecting means between the said first means and the textile material being of sufficient length so that when the textile material is completely submerged the second means is not drawn down into the light beam, the second means being of sufficient weight when submerged to overcome the buoyancy of the textile material when completely wet and insufficient until the textile material is completely wet to cause it to sink in said liquid, the first means interrupts the light beam when the textile material first contacts the liquid in said container and the said second means interrupts the light beam when the textile material begins to sink to the lower part of said liquid, a photoelectric pickup unit adapted to receive the light beam at the other end of said container, an electric timing device connected with an electric means for starting said timing device, said electric means being connected with said pickup unit so as to start said timing device at the first interruption of the light beam and stop said timing device at the next subsequent interruption of the light beam.

DONALD E. MARNON.
FRANKLIN C. SNOWDEN.

References Cited in the file of this patent

UNITED STATES PATENTS

| Number | Name | Date |
| --- | --- | --- |
| 2,252,572 | Lang | Aug. 12, 1941 |
| 2,255,266 | Moorefield | Sept. 9, 1941 |
| 2,388,387 | Cohen | Nov. 6, 1945 |
| 2,490,627 | Hofberg | Dec. 6, 1949 |
| 2,545,281 | Hunt | Mar. 13, 1951 |

OTHER REFERENCES

Publication, American Assoc. of Textile Chemists and Colorists, Technical Manual, pages 143-145, vol. 25.